United States Patent
Malin et al.

(10) Patent No.: US 11,604,868 B2
(45) Date of Patent: Mar. 14, 2023

(54) SYSTEMS AND METHODS FOR LEVERAGING INTERNET IDENTITY FOR DIGITAL CREDENTIALING

(71) Applicant: BadgeCert Inc., Northbrook, IL (US)

(72) Inventors: Jay Malin, Northbrook, IL (US); Ginger Malin, Northbrook, IL (US); Raed Adhami, Hawthorn Woods, IL (US)

(73) Assignee: BadgeCert Inc., Northbrook, IL (US)

( * ) Notice: Subject to any disclaimer, the term of this patent is extended or adjusted under 35 U.S.C. 154(b) by 173 days.

(21) Appl. No.: 16/880,940

(22) Filed: May 21, 2020

(65) Prior Publication Data

US 2021/0365544 A1    Nov. 25, 2021

Related U.S. Application Data

(60) Provisional application No. 62/821,693, filed on Mar. 21, 2019.

(51) Int. Cl.

| | |
|---|---|
| *G06F 21/45* | (2013.01) |
| *H04L 9/00* | (2022.01) |
| *H04L 9/08* | (2006.01) |
| *H04L 9/10* | (2006.01) |
| *H04L 9/30* | (2006.01) |
| *G06Q 10/00* | (2012.01) |
| *G06Q 50/26* | (2012.01) |
| *G06Q 30/00* | (2012.01) |
| *G06F 16/27* | (2019.01) |
| *G06Q 30/018* | (2023.01) |

(52) U.S. Cl.
CPC .............. *G06F 21/45* (2013.01); *G06F 16/27* (2019.01); *G06Q 30/0185* (2013.01); *G06Q 50/265* (2013.01); *H04L 9/0819* (2013.01); *H04L 9/30* (2013.01); *G06Q 2220/00* (2013.01); *H04L 9/50* (2022.05)

(58) Field of Classification Search
CPC ..... G06F 21/45; G06F 16/27; G06Q 30/0185; G06Q 50/265; G06Q 2226/00; H04L 9/0819; H04L 9/30; H04L 2209/38
See application file for complete search history.

(56) References Cited

U.S. PATENT DOCUMENTS

| | | | |
|---|---|---|---|
| 9,007,174 B2* | 4/2015 | Cazanas | G07C 9/27 340/5.81 |
| 9,397,980 B1* | 7/2016 | Chen | G06F 21/33 |

(Continued)

FOREIGN PATENT DOCUMENTS

| | | | | |
|---|---|---|---|---|
| EP | 3704620 B1 * | 12/2021 | ......... | G06F 16/2379 |
| WO | WO-2019204794 A1 * | 10/2019 | ............ | G06F 21/31 |
| WO | WO-2020192948 A1 * | 10/2020 | ............ | G06F 21/32 |

*Primary Examiner* — Darshan I Dhruv
(74) *Attorney, Agent, or Firm* — Leydig, Voit & Mayer, Ltd.

(57) ABSTRACT

Disclosed are a system and method for an identity integration platform to leverage decentralized Internet identity services to streamline and secure the credentialing process for a variety of identity providers, credentialing service providers, and their users. The identity integration platform may operate as a conduit between these entities in a platform agnostic manner to ensure compatibility across a variety of entities without standardization. An application programming interface to facilitate interoperability is also described.

9 Claims, 10 Drawing Sheets

(56) References Cited

U.S. PATENT DOCUMENTS

| | | | | |
|---|---|---|---|---|
| 9,934,541 | B1* | 4/2018 | Spertus | G06Q 50/265 |
| 2012/0110330 | A1* | 5/2012 | Dickgiesser | H04L 9/3271 |
| | | | | 713/168 |
| 2014/0123257 | A1* | 5/2014 | Gordon | H04L 63/08 |
| | | | | 726/7 |
| 2017/0330180 | A1* | 11/2017 | Song | G06F 16/22 |
| 2018/0181745 | A1* | 6/2018 | Chen | G06Q 50/265 |
| 2018/0302391 | A1* | 10/2018 | Jones | G06F 16/284 |
| 2019/0319808 | A1* | 10/2019 | Fallah | H04L 9/3265 |
| 2019/0319940 | A1* | 10/2019 | Hamel | H04L 9/3271 |
| 2019/0333054 | A1* | 10/2019 | Cona | G06Q 20/383 |
| 2020/0026834 | A1* | 1/2020 | Vimadalal | G06F 16/9024 |
| 2020/0177377 | A1* | 6/2020 | Smith | G06Q 20/02 |
| 2020/0220726 | A1* | 7/2020 | Lougheed, III | G06F 16/211 |
| 2020/0234389 | A1* | 7/2020 | Nakashima | G06Q 50/30 |
| 2020/0274713 | A1* | 8/2020 | Li | H04L 9/3221 |
| 2020/0334930 | A1* | 10/2020 | Masood | G07C 9/257 |
| 2020/0403805 | A1* | 12/2020 | Steele | G06F 21/602 |
| 2021/0083850 | A1* | 3/2021 | Lingala | H04L 9/0637 |
| 2021/0176075 | A1* | 6/2021 | Chu | H04L 9/3247 |
| 2021/0243023 | A9* | 8/2021 | Khan | G06V 40/172 |
| 2021/0272120 | A1* | 9/2021 | Murdoch | G06Q 20/3829 |
| 2021/0383377 | A1* | 12/2021 | Zhou | G06Q 20/02 |

\* cited by examiner

SYSTEMS AND METHODS FOR LEVERAGING INTERNET IDENTITY FOR DIGITAL CREDENTIALING

CROSS-REFERENCE TO RELATED APPLICATIONS

This patent application claims the benefit of U.S. Provisional Patent Application No. 62/821,693, filed on Mar. 21, 2019, which is hereby incorporated by reference in its entirety.

TECHNICAL FIELD

The present application relates to the field of identity authentication and, more specifically, to systems and methods for creating and managing digital credentials.

BACKGROUND

The promise of new self-sovereign technologies and standards allows us to secure identify ourselves over the Internet. Credential issuing authorities need no longer identify us by an email address, last four of our social security, or ZIP code. People now have the opportunity to create a single, immutable, secure Internet identity on the same platform upon which next-generation financial services platforms are built, the distributed ledger (DL), or popularly called Blockchain. In spite of the hype and numerous platform initiatives, there has not previously been an operational high-stakes credentialing platform on DL's that leverage self-sovereign identity.

Paper documents for passports, driver's licenses, or professional credentials are traditionally combined with other identifying government-issued documents to verify the credential. Yet, none of this truly avoided fraud. Today, most electronic credentials are tied to a phone number or email address, and are subject to tampering.

An unsolved need exists to have a combination of hardware and software to leverage Internet identity systems to create a credentialing platform.

SUMMARY

An identity integration platform is introduced to streamline and secure the credentialing process for a variety of identity providers, credentialing service providers, and their users. An example of such a streamlined process is described below with respect to the DHS Trusted Traveler (TT) programs.

A solution in accordance with embodiments of the disclosed systems and methods advantageously provides benefits over prior solutions, such as: it is vendor agnostic by leveraging open interfaces and frameworks; it allows for credential revocations in the case of misuse; it complies with government security standards as defined by FIPS 201, nonexclusively in accordance with https://nvlpubs.nist.gov/nistpubs/FIPS/NIST.FIPS.201-2.pdf; its data cannot be deleted, making it comparable or better to paper documentation; it uses identity verification leveraging strong authentication technologies, such as AAL2 in accordance with https://pages.nist.gov/800-63-3/sp800-63-3.html; the user is enabled to control consent of the credential in accordance with impending WC3 standards, https://w3c-ccg.github.io/did-spec/; credentials are visible both on and off-line to the verifier; and personally identifiable data is not be stored on the distributed ledger.

The foregoing advantages may be achieved in part by upgrading the BadgeCert electronic credentialing platform, as described, for example, in U.S. Patent Publication No. 2014/0353369, to incorporate Internet identity (DID) providers, government credentials, distributed ledger, and custom workflows for various credentialing programs, such as Trusted Traveler. An end-to-end workflow is created for credential issuing authorities to leverage Internet identity to create a secure, immutable credential that can be selectively shared by a person with, e.g., a transportation security officer at an airline checkpoint. Further, by incorporating Identity and the Trusted Traveler credential with airline reservations system, users can quickly and confidently enter secure terminal areas without divulging unnecessary personal details. In the future, the TSA may also use biometrics stored in the person's identity as an additional validation of identity.

DETAILED DESCRIPTION

Embodiments of the disclosure provide an identity integration platform to facilitate the issuance, management and verification of electronic credentials for high-stakes professional development certification programs. Credential issuing organizations may author and publish electronic credentials, create a roster of recipients, and issue the credentials to recipients. Recipients are preferably defined by a first and last name and email address. Credential issuing organizations undergo a verification process and are offered secure access to the platform. When a credential is issued, the recipient is preferably notified by electronic email with a shortened URL link to a custom web page with details of the credential. Through the use of such a credentialing software platform, credential recipients are preferably able to login to a digital wallet that allows the recipient to selectively share personal details. Further, the platform includes a rich set of published modern API's. Embodiments of the disclosure employ credentialing software platforms, such as the BadgeCert software platform, as described, for example, in U.S. Patent Publication No. 2014/0353369, which is hereby incorporated by reference.

Figure 1:
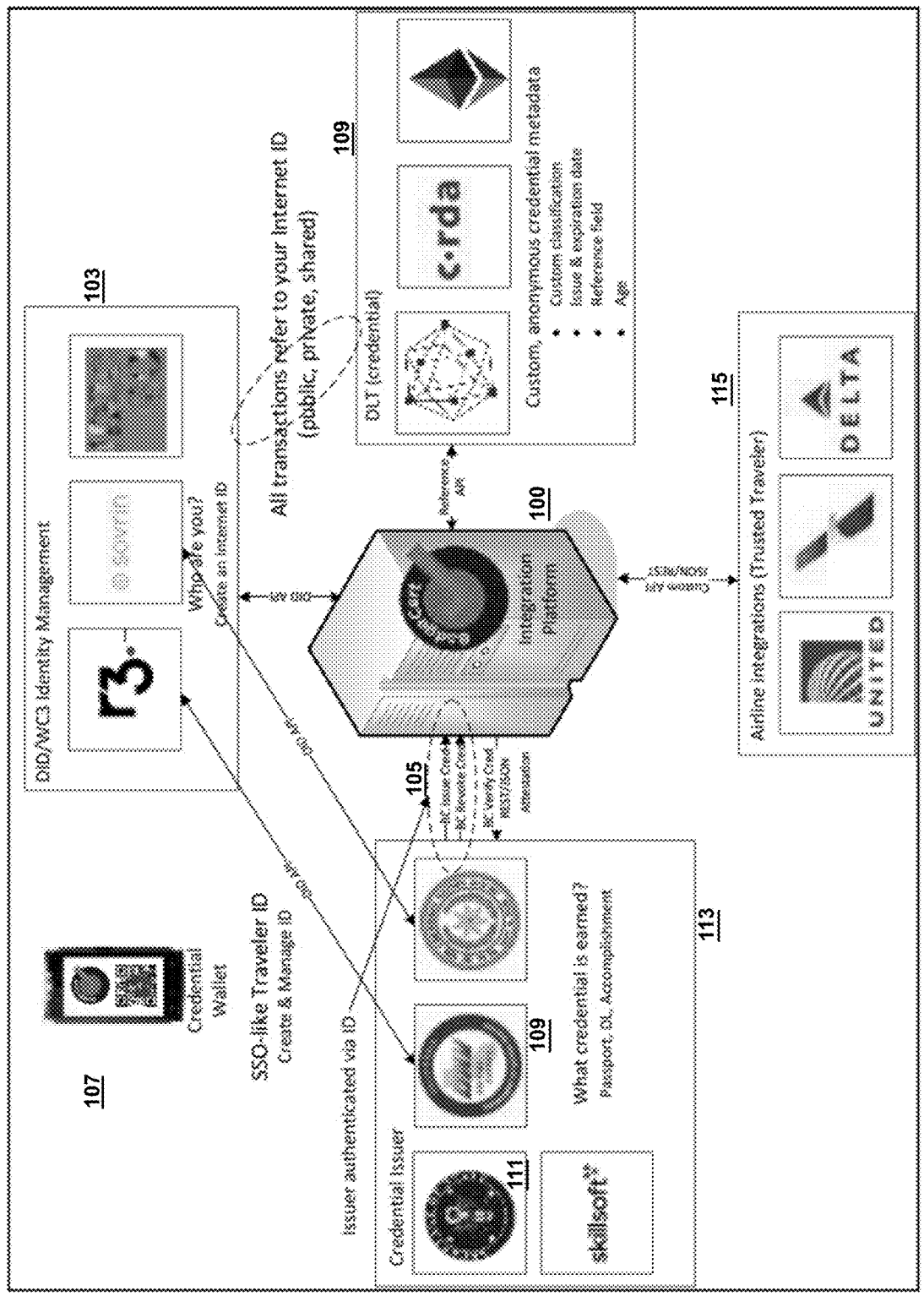
FIG. 1 is a block diagram of a system in accordance with certain embodiments of the disclosure, in accordance with an embodiment of the disclosure.

An exemplary scenario for leveraging internet identity for credentialing is now generally described with respect to FIG. 1, and includes the integration of an airline DHS Trusted Traveler (TT) system and decentralized identity systems for issuance, verification, and storage of credentials. At the center of this integration is an identity integration platform 100. In the example, a user first visits a credential issuer, such as a State Department of Motor Vehicles (DMV) 101 to acquire a motor vehicle license. The DMV has previously selected one or more decentralized identifier (DID) agencies 103, or self-sovereign platforms, to provide identity services. During the person's visit to the DMV, the user creates an identity with the State's selected identity platform provider. The user is provided a private key, such as used in a public-key cryptographic system, to manage his identity. The DMV issues the motor vehicle license credential 105 to the user.

In accordance with an embodiment of the disclosure, the user in the example has installed an identity integration application 107, such as a credential wallet, on his mobile phone or other device, and adds the private key provided by the DMV to the application. Accordingly, the user may "countersign" the credential to accept it into his wallet, and have it added to distributed ledger 109. The user is then able to select his identity and credential to share as needed, such as if validation is requested by a verifier.

Continuing with the example scenario, the user may later wish to become a Trusted Traveler under the Department of Homeland Security (DHS), and visits the DHS website 111, where he is offered to identify himself via the DID 103 that was registered by the state's DMV. Several additional elements may be added to the user's identity, and DHS checks various documents. If acceptable to DHS, the Trusted Traveler credential is then added to the person's identity 103 and issued to the distributed ledger 109. The Trusted Traveler credential is visible on the user's credential wallet 107 on his device.

Continuing with the example scenario, the user may then visit an airline website 115 to purchase a ticket, where he is asked to share an identity key. The ticket is purchased and may be added to the user's credential wallet or other application on his device. Upon arrival at the airport, the user may enter a Trusted Traveler line for security clearance, at which point the user may request, via the credential wallet 107, a time-sensitive bar code or other readable credential representation. The bar code is rendered via the credential wallet and scanned by the security officer, who is presented with confirmation of the user's identity and Trusted Traveler credential. Based on the credentials provided, the user's identity is confirmed by the security officer, and the user is permitted to pass through security.

In greater detail, embodiments of the disclosure integrate decentralized identifiers (DID) 103, credential issuers 113, and distributed ledgers 109 via an identity integration platform 100. There are numerous decentralized identifiers 103 (or self-sovereign platforms) on which people may create an Internet identity. A person initially creates his/her identity at a governmental agency such as the Department of Motor Vehicles (DMV) 101. To avoid duplicity in identities, the DMV likely has reciprocity with other state agencies using the same or other DID platforms. Once registered, the person is able to use her identity in the form of key on a mobile phone application (app) or other device in the form of a credential wallet 107 or similar app. Further, the DMV not only performs the function of identifying the person via electronic, physical, and biometric information, but it issues a credential in the form of a Motor Vehicle License (MVL). The MVL credential issued by the DMV is preferably is stored to the user's app 107 via a published application programing interface (API) of the identity integration platform 100, and may be selectively displayed by the user to show achievement of the MVL credential.

In accordance with an embodiment of the disclosure, the API of the identity integration platform preferably provides at least the following functions:

(a) adding the credential to the identity (not allow credential issuers can create Internet identity);
(b) creating a block on the distributed ledger (DL), or blockchain, platform;
(c) maintaining a digital wallet on the app; and
(d) selectively sharing the credential for the purpose of facilitating transactions such as the issuance of an airline ticket.

Figure 2:
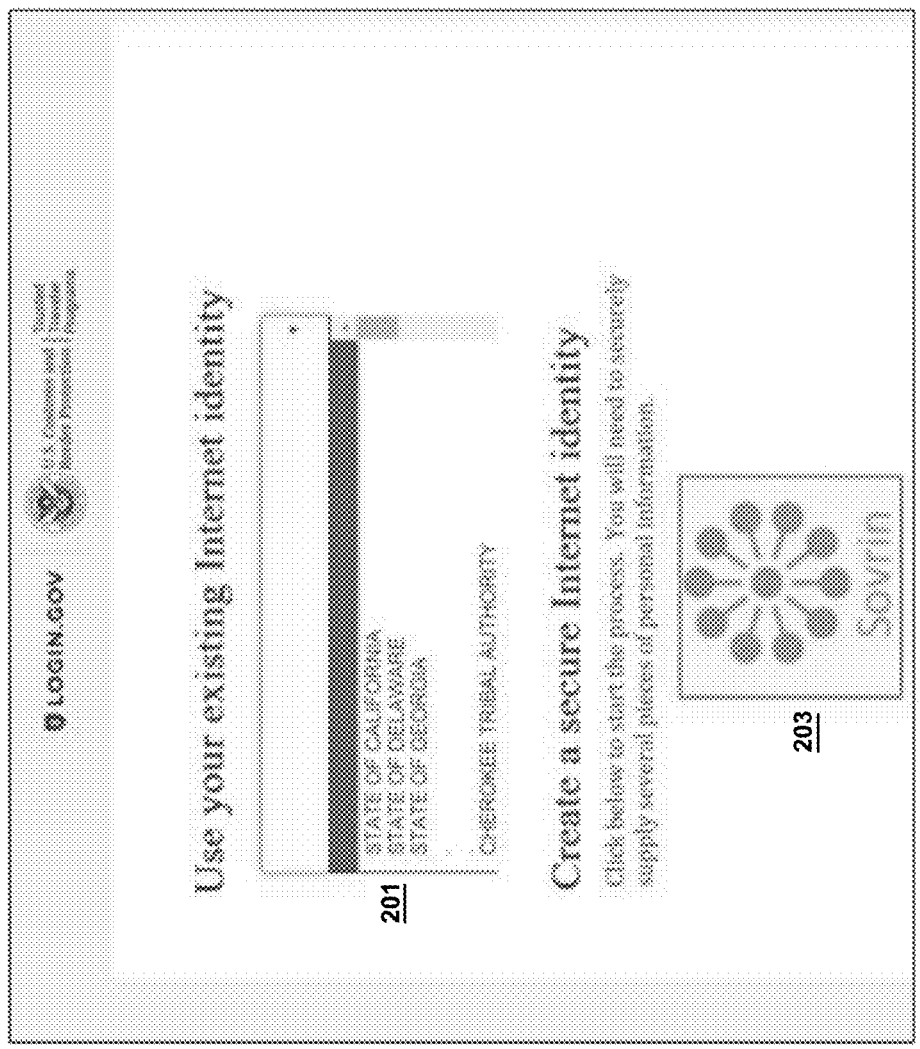
FIG. 2 is a screenshot of a sample credential service provider user interface for selection of an identity provider, in accordance with an embodiment of the disclosure.

Through the use of an API and an identity integration platform 100 as disclosed, standardization of DID platforms is not required. Nevertheless, governmental agencies, credential issuing authorities, and related entities may integrate DID platforms using similar paradigm single sign-on (SSO). For example, FIG. 2 provides an example of how a person may select from a list of choices 201 a particular governmental agency which issued his identity via one of the industry DID providers 203. Additionally, agencies may themselves create an identity via credential issuing authorities, such as the Internal Revenue Service (IRS) and Dun & Bradstreet.

Once a user's Internet identity is established, the user may download his private key and store it on an app 107 or website provided by the governmental agency. Through the identity integration platform 100, the user creates a public key that can be shared to establish identity. As an example, this key may be used for the purpose of renewing a travel document, such as a US Passport with the Secretary of State, or renewing a medical license. In embodiments of the disclosure, a plug-in application accessible via the credentialing authority's website permits the person to use his identity to register, and upon completion of the requirements for the credential, the credential is issued via the identity integration platform 100. A block with the credential's metadata is then created on the distributed ledger 109 and becomes viewable in the user's credential wallet 107 for both on and off-line viewing on the app.

Figure 3:
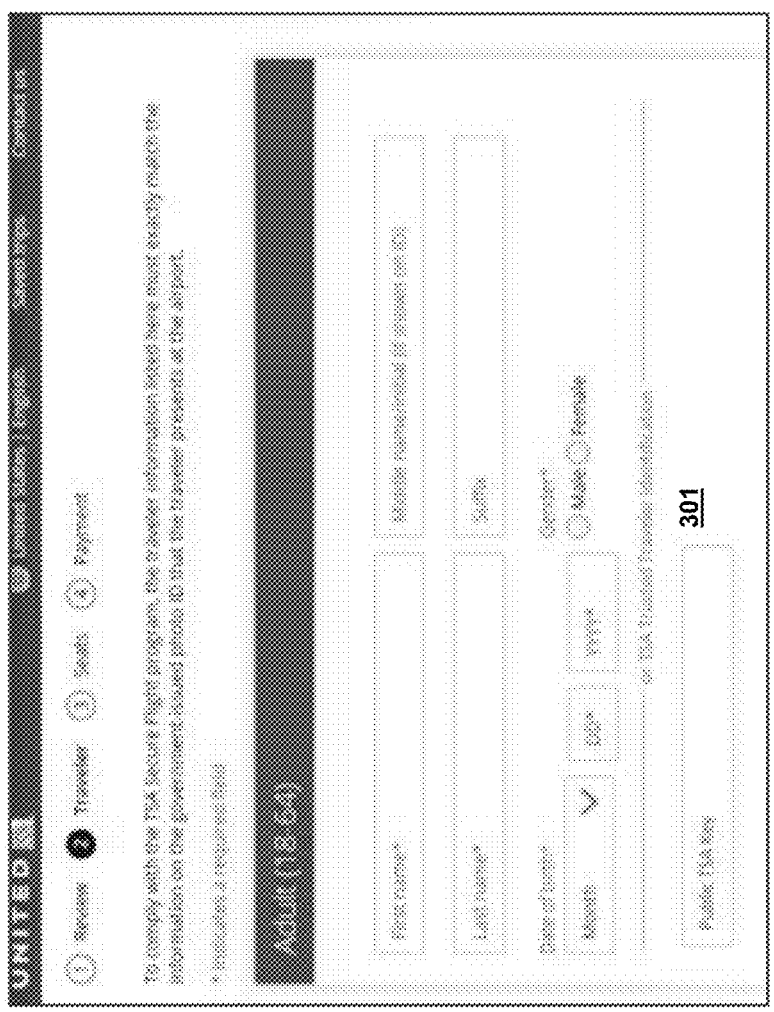
FIG. 3 is a screenshot of a sample verifier user interface for presentation of a digital identity, in accordance with an embodiment of the disclosure.

In embodiments of the disclosure, the identity integration platform 100 facilitates the use of earned credentials to perform other tasks, such as purchasing and using an airline ticket. Turning to FIG. 3, for example, a user with an established Internet identity (or having used one already completed on a related website) and having earned the credential, "Trusted Traveler," is able to purchase an airline ticket on the airline website and establish his identity and trusted traveler status through a screen selection 301 and provision of his public key. The identity integration platform 100 communicates between the identity provider 103, the trusted traveler credentialing service 111, and the airline 115. The airline 115 may then store the information as part of the user's Airline Frequent Flyer profile, though the user may still be required to identity himself in order to associate the ticket with his identity. The user may then a use a credential wallet 107 or similar smart phone or device application to share his Trusted Traveler status upon entry into the Trusted Traveler line at the airport.

Figure 4:
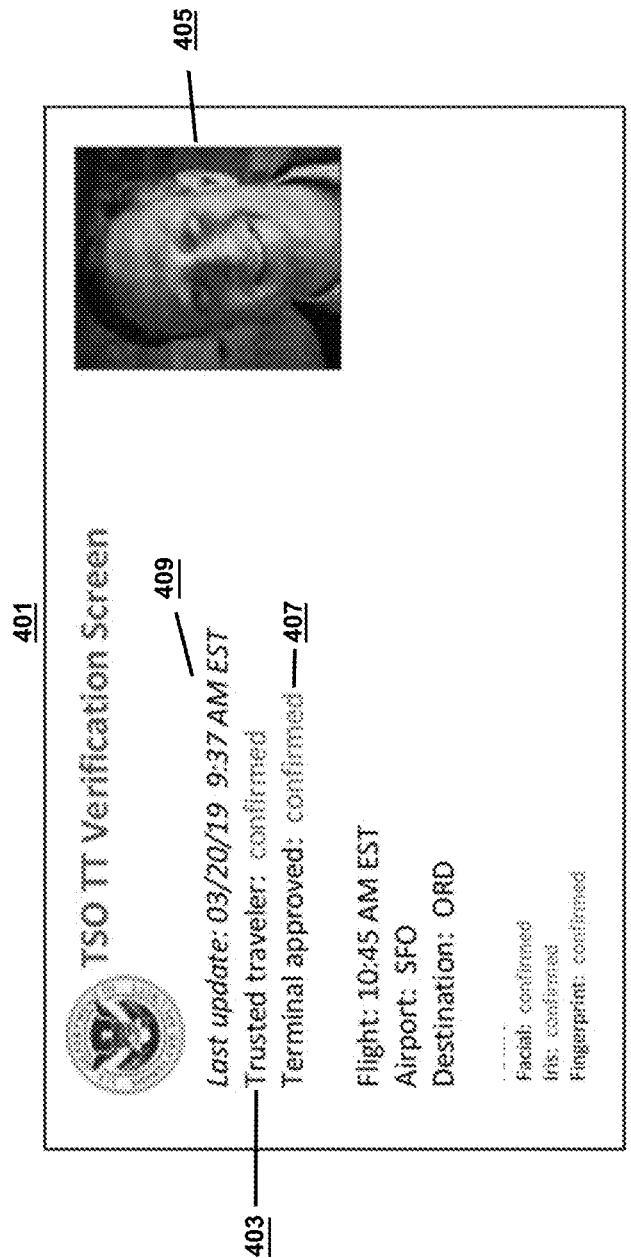
FIG. 4 is a screenshot of a sample verifier user interface for confirmation of a user's digital credentials, in accordance with an embodiment of the disclosure.

An exemplary use of a credential wallet application 107 is shown in FIG. 4, in accordance with embodiments of the disclosure. The credential wallet 107 preferably displays a user's barcode, QR code, or other computer readable code for scanning, and additionally provides the user's credentials and any other information needed. Upon presentation of the user's credential wallet 107, the security officer preferably scans the code via a networked computing device to obtain verification of identity and credentials for the user, via the distributed ledger. For example, the security officer is presented, for example, with a screen 401 indicating that the user is a Trusted Traveler 403, provides a picture of the user 405, and indicates that the airline ticket timestamp meets the airports requirements (e.g., travel within 4 hours) 407. The time of the last credential update 409 is also provided, as is flight and airport information 411. In this manner, the validity of the credential and its issuer are confirmed. Also confirmed is that the credential has not been revoked or altered.

In embodiments of the disclosure, the identity integration network uses a published open framework that is available to credential issuers using JSON calls. API transactions are secured by the issuer's identity. Sample XML, documents are provided for each call, as shown in the following examples.

Create Credential

The credential issuing authority preferably creates its credentials and publishes them to the identity integration platform. Each credential has a name, a set of custom fields [1 . . . n], a template, and a graphical picture. A sample is shown below. There is also a create date/time that the credential is created on the platform.

```
<xmlrequest>
    <operation>CB</operation>
    <badgeDetails>
        <badgeName>Standard Motor Vehicle License</badgeName>
        <badgeDescription>State of Illinois Driver's License</badgeDescription>
        <badgeTemplate>SMVLtemplate.css</badgeTemplate>
        <badgePicture>smvlpicture.png</badgePicture>
    </badgeDetails>
    <badgeFields>
    <badgeField1>
        <fieldName>Classification</fieldName>
        <fieldText>Class:</fieldText>
        <fieldType>Text</fieldType>
    </badgeField1>
    <badgeField2>
        <fieldName>Maximum Vehicle Weight</fieldName>
        <fieldText>Max Weight:</fieldText>
        <fieldType>Text</fieldType>
    </badgeField2>
    </badgeFields>
    <createDate>2017-08-18T04:04:39:031Z</createDate>
</xmlrequest>
```

Certain standard fields, such as issuance and expiration date, may not be required. Date and UTC time are international fields with precision to the millisecond.

Issue Credential

Embodiments of the disclosure permit a credential to be issued to a user, defined by a public key (SHA256), without knowledge of the user's actual identity. This offers the user complete control of his credential, including anonymity. Such anonymity may help mitigate bias in any downstream selection process such as "Approved" by a security officer or "Hired" by a prospective employer.

```
<xmlrequest>
    <operation>IB</operation>
    <issuanceDetails>
        <issuerID>
0b0f5067aa528671474a7ff40e7131c85f40215b9abad94-e11d152d22afcfe37</issuerID>
        <attestationIP>2601:246:5200:6ec:e90c:1d56:cc5f:
            3f19</attestationIP>
        <personID>
0b0f5067aa528671474a7ff40e7131c85f40215b9abad94-e11d152d22afcfe37</personID>
        <badgeID>823492348613</badgeID>
        <issuanceDate>2017-08-18T04:04:39:031Z</issuanceDate>
        <expirationDate>2017-08-18T04:04:39:031Z</expirationDate>
    </issuanceDetails>
    <badgeFields>
        <badgeField1>A</badgeField1>
        <badgeField2>5000</badgeField1>
    </badgeFields>
    <createDate>2017-08-18T04:04:39:031Z</createDate>
</xmlrequest>
```

Revoke Credential

Embodiments of the disclosure permit revocation of issued credentials. Beyond the API issuance transaction, there are at least two ways to revoke a credential from distributed ledger. The first is to use the attestation IPv6 address to query the issuing organization for the validity of the credential. This is similar to the verification process described below. The second method of revocation is to create an amendment to the issued block via a reference hash in the block. This method performs similarly to a Bitcoin ledger, with the person's "balance" being the sum of the issuance and revocation event. This functionality may be considered as a "cryptographic accumulator."

```
<xmlrequest>
    <operation>RB</operation>
    <revocationDetails>
        <issuerD>
0b0f5067aa528671474a7ff40e7131c85f40215b9abad94-e11d152d22afcfe37</issuerID>
        <personID>
0b0f5067aa528671474a7ff40e7131c85f40215b9abad94-e11d152d22afcfe37</personID>
        <badgeID>823492348613</badgeID>
        <revokationDate>2017-08-18T04:04:39:031Z</revokationDate>
    </revocationDetails>
    <createDate>2017-08-18T04:04:39:031Z</createDate>
</xmlrequest>
```

Verify Credential

Embodiments of the disclosure provide for the verification of a credential by an authorized party, such as a travel security officer. The public key (SHA256), is preferably used to share any credential or identity detail that the user has selected to be shared using this key. The response to a valid API request using the public key is similar to the XML, listed for issuing credentials, above.

Figure 5:
FIG. 5 is a sampling of screenshots from a credential wallet executing on a user's smart phone, in accordance with an embodiment of the disclosure.

In accordance with embodiments of the disclosure, an application ("app") 107 is provided for execution on a smart phone or other device to serve as a secure repository for a user's identity key and credentials, received from the integration identity platform. Smart phone features such as fingerprint and facial recognition are preferably used to serve to enhance app security. The app provides options for a user to set his viewing and sharing settings for identity and each credential; as such, the user is able to determine the minimal required information to satisfy the viewer, such as a travel security officer or a Border Control Officer. Once shared, a time-sensitive QR code is displayed that can be instantly read and verified by an authority. FIG. 5 shows several exemplary screens for the app 107, including a general menu screen 501, an information selection screen 503, a sample credential screen 505, and a barcode screen 507. Screen 509 indicates a user has been issued a credential linking his identity with an electric utility location. For any credential specific screen, the issuing authority is preferably displayed along with (a) information the user has configured; and (b) the least of amount of information required for verification. In certain embodiments, the app caches data for brief time-to-live (TTL) intervals, generally 24 hours, after which, it must be updated over the Internet. This will allow both on-line and off-line performance. The app is also preferably able to accept verified credentials for the user that are issued by other authorities on platforms other than the identity integration platform, provided there is a match of Internet identity.

Figure 6:
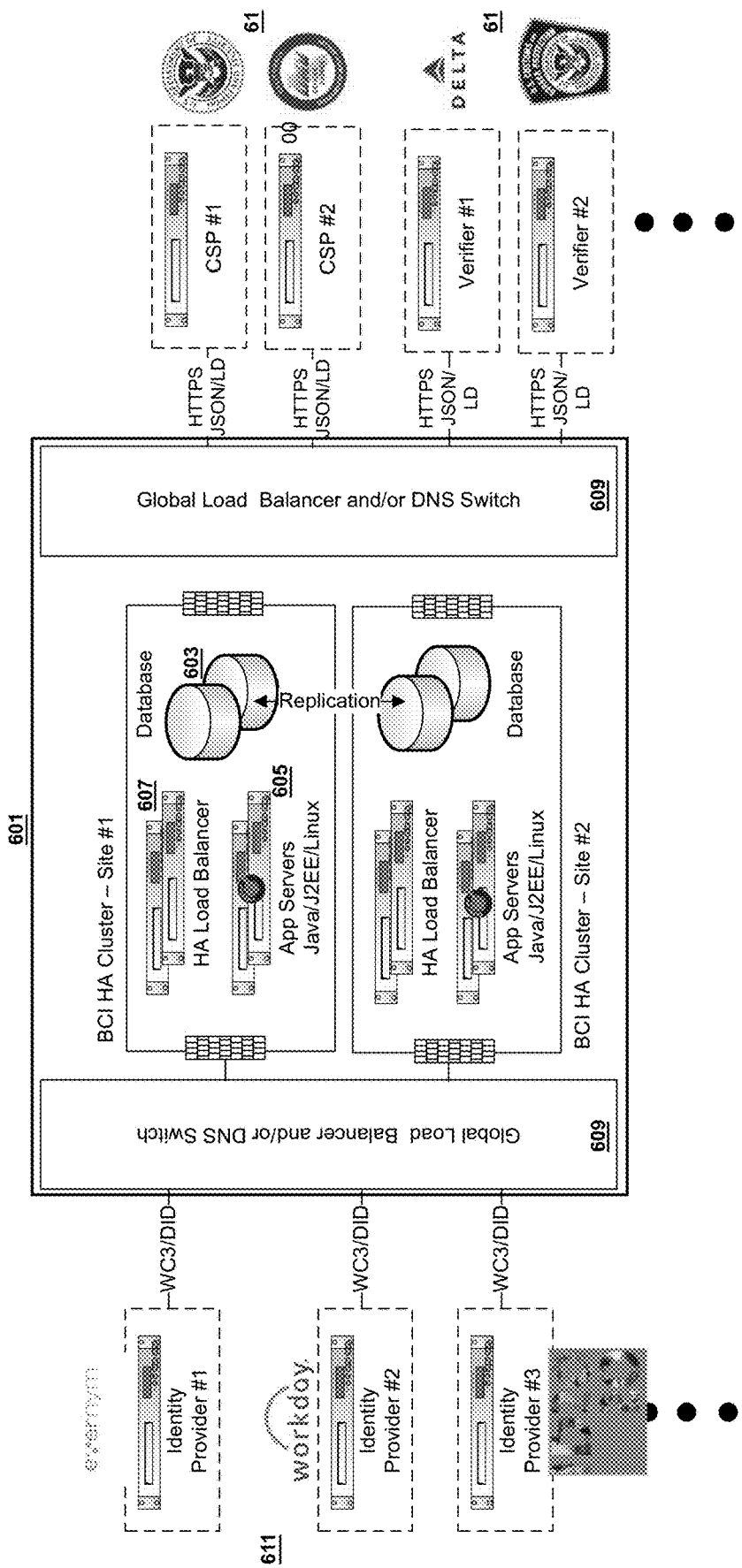
FIG. 6 is a diagram of a system architecture for an identity integration platform, in accordance with an embodiment of the disclosure.

Turning to FIG. 6, a system architecture for an identity integration platform 601 is described, in accordance with embodiments of the disclosure. The identity integration platform 601 preferably comprises one or more databases 603 in connection with application servers 605 operating Java/J2EE/Linux in a clustered environment. Local and global load balancing 607, 609 and real-time database replication maximize availability and geographic redundancy/disaster recovery. Firewalls and application functionality shield the database from attack. Integration is performed with SSL encrypted JSON APIs. In this manner, the identity integration platform 601 preferably communicates with identity providers 611, credential service providers 613, and verifier integration partners 615, who may authenticate using Internet identity.

Figure 7:
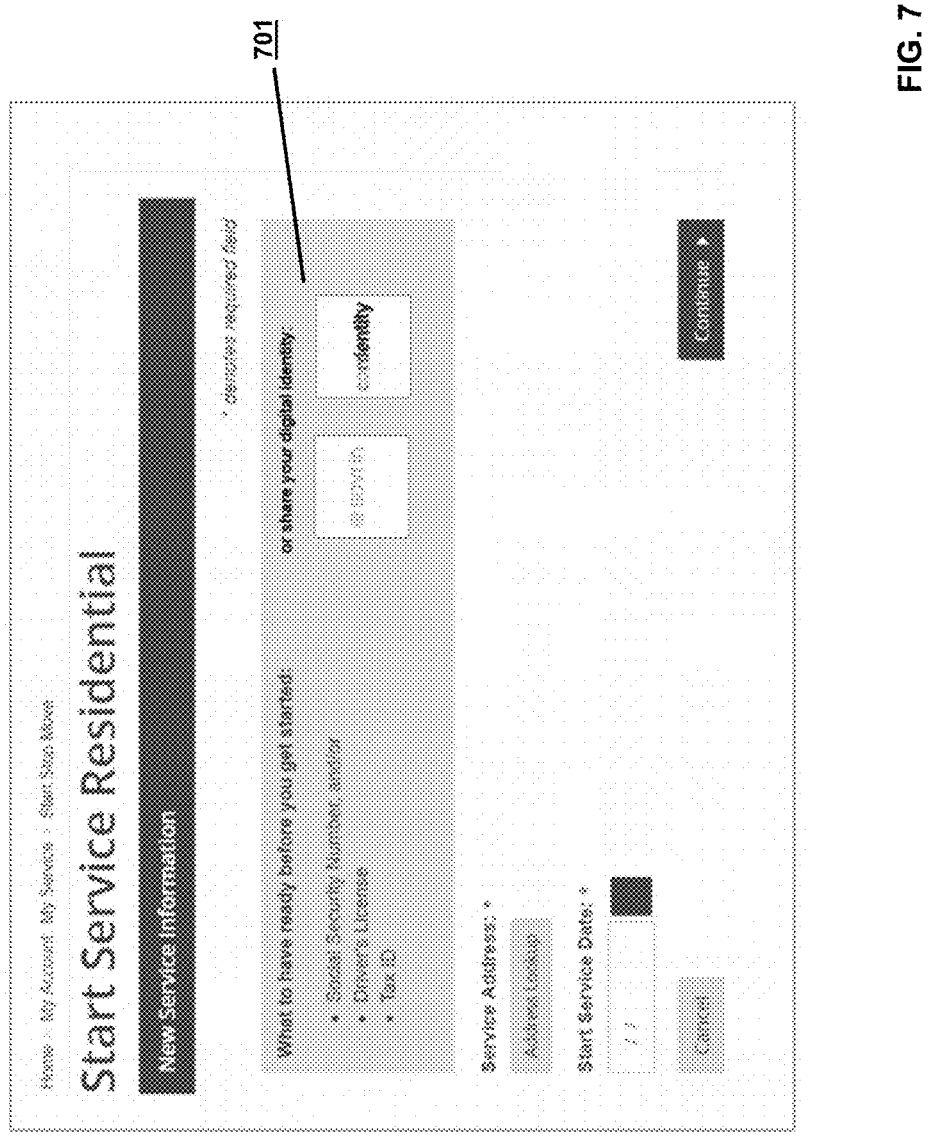
FIG. 7 is a screenshot of a sample credential service provider user interface for selection of an identity provider, in accordance with an embodiment of the disclosure.
Figure 8:
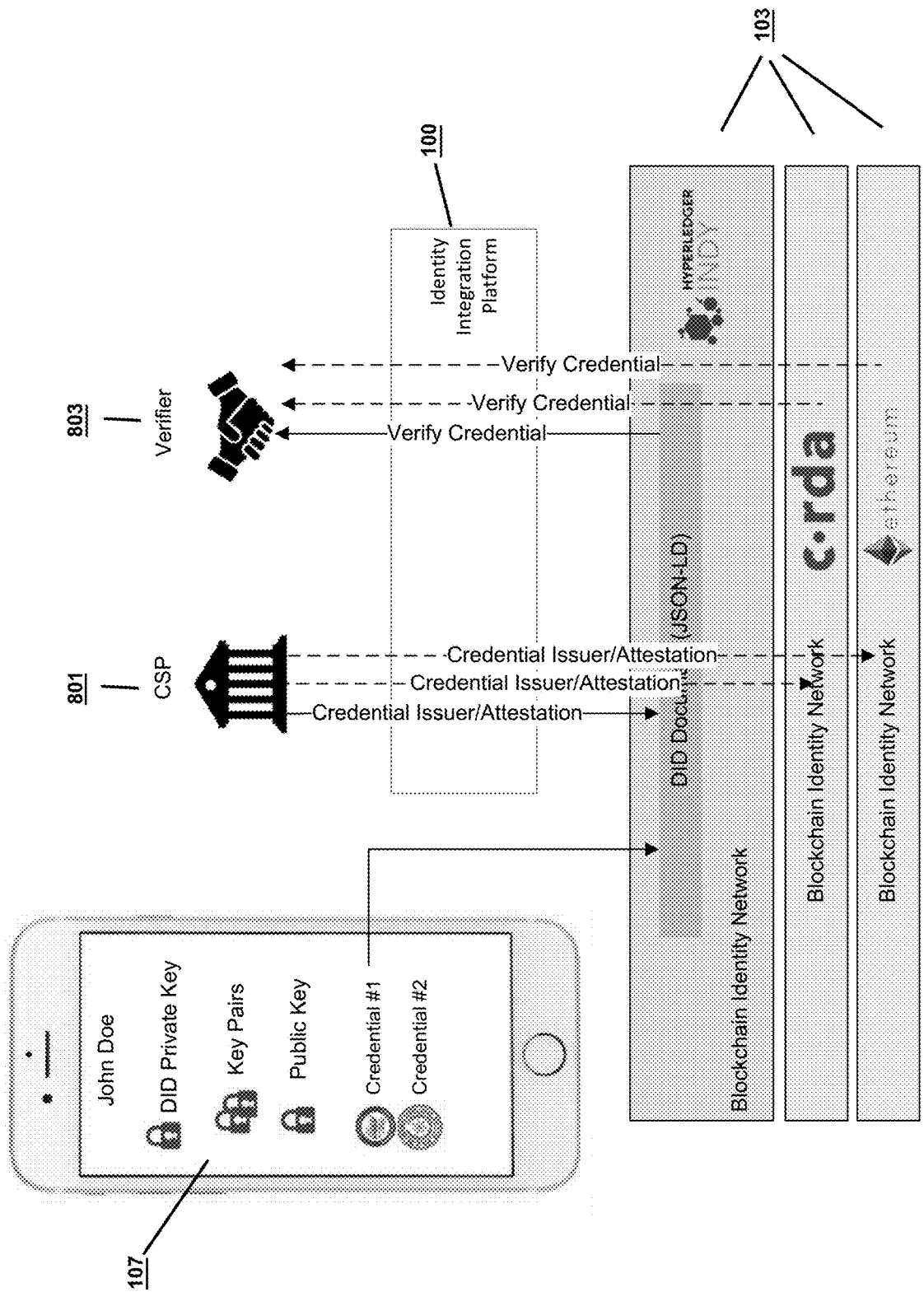
FIG. 8 is a diagram of a system architecture for an identity integration platform, in accordance with an embodiment of the disclosure.

Turning to FIG. 7, an additional example is now described for leveraging digital identity for credential management using an identity integration platform in the context of starting residential utility service, in accordance with embodiments of the disclosures. Frequently, the start of new residential utility service is a cumbersome, time-intensive, and interactive process by which the customer provides various forms of identity and credit worthiness. The customer may be asked to provide their social security number, previous addresses, other forms of credit guarantees, and contact information. This process is carried out over the phone with a Customer Service Representative (CSR) or on-line. Some efforts are underway to simplify flows for existing account transfers using interactive voice recognition (IVR) and web forms. Major utilities undergo a process, sometimes called the "Name Game", to further discern customers with similar names, especially if credit-worthiness is questionable. In embodiments of the disclosure, a customer is provided an option 701 to share only his decentralized identity by selecting his decentralized identity service provider. Once the provider has been selected, the customer accesses his key to authorize and share only the necessary data that defines identity and credit worthiness. Upon completion, the utility company is now also able to attest that the customer's identity includes a utility account credential, which can be added to the distributed ledger and made available in the user's credential wallet FIG. 8 provides a further illustration of the operation of an identity integration platform 100 in accordance with embodiments of the disclosure. Verifiers, such as the utility company in the example above, need not integrate their customer information systems (CIS) with all decentralized identity networks; rather, the identity integration platform operates as an intermediate layer that aggregates the DID networks and makes them readily available. The identity integration platform 100 aggregation platform is preferably publicly available and offers a simple JSON integration model that relieves credential service providers 801 and verifiers 803 (such as the utility company), of the burden of integrating with each identity network 103. Note in this utility example, the utility is both the CSP and the verifier. Through a device app such as a credential wallet 107, users interact via the identity integration platform 100 to present and receive credentials to and from CSPs 801 and verifiers 803.

In some embodiments, the identity integration platform enables efficient transactions, such as the exchange of energy utility credits. For example, an energy prosumer can deliver value to the utility by purchasing energy and providing surplus energy. Distributed Energy Response (DER) generation is delivered by a combination of solar, wind, or battery. In many instances, the DER unit is not be a current customer of a utility company but rather a source wishing to remain anonymous. The source may also maintain a digital identity to which the utility pays for each unit of energy—a Kilowatt hour or Therm—with a digital currency such as a Sovrin token. Tax authorities are notified of the transaction by shared tax identity credentials. Although the use of Blockchain/distributed ledger has been used for trading energy, the use of an identity integration platform as described herein permits the use of digital identity to define the participants in the transaction.

Figure 9:
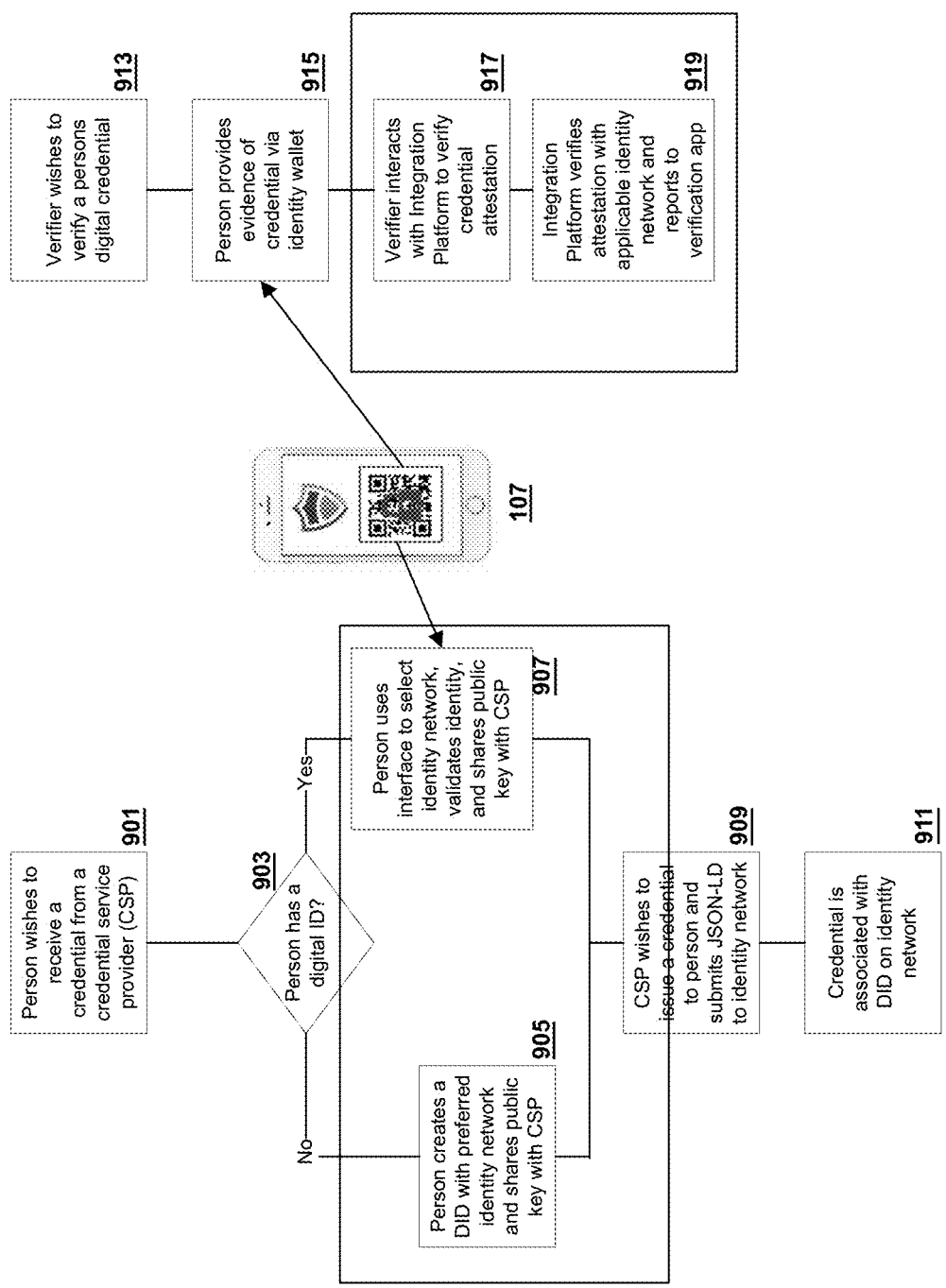
FIG. 9 is a flow diagram of a sample credential issuance and verification process using an identity integration platform, in accordance with an embodiment of the disclosure.

Methods of receiving a credential and verifying a credential are now described with reference to FIG. 9. In step 901, a user who wishes to receive a credential presents begins the process through, for example, a website interface associated with the credential service provider. At step 903, the user is provided an option, on the CSP website interface, for example, of indicating whether he already has a digital identity. If the user does not have a digital identity, then at step 905 the user creates a digital identity with a preferred identity network of the CSP, receiving a public key which is then shared with the CSP. If the user already has a digital identity on an identity network, then he selects the identity network from options presented on the CSP website interface, and proceeds to validate his identity at step 907 via the identity integration platform. The user may use a credential wallet 107 or similar application on a smartphone or other device in the identity validation process. At step 909, the CSP issues the credential for the user and submits corresponding metadata to the identity network, preferably in the form of JSON-LD messages, through the identity integration platform. At step 911, the credential is associated with the user's decentralized identification on its identity network, and a corresponding block is added on the distributed ledger.

A preferred verification process begins at step 913, with a verifier who wishes to verify that a user has earned a particular digital credential. The user provides evidence of the credential to the verifier at step 915, preferably through a bar code, QR code or other digital code presented through a credential wallet 107 or similar application on a smartphone or other device. At step 917, the verifier interacts with the identity integration platform to effect a query of the applicable identity network to verify the credential attestation. At step 919, the identity integration platform verifies the attestation with the applicable identity network, and reports back the result of the verification.

Figure 10:
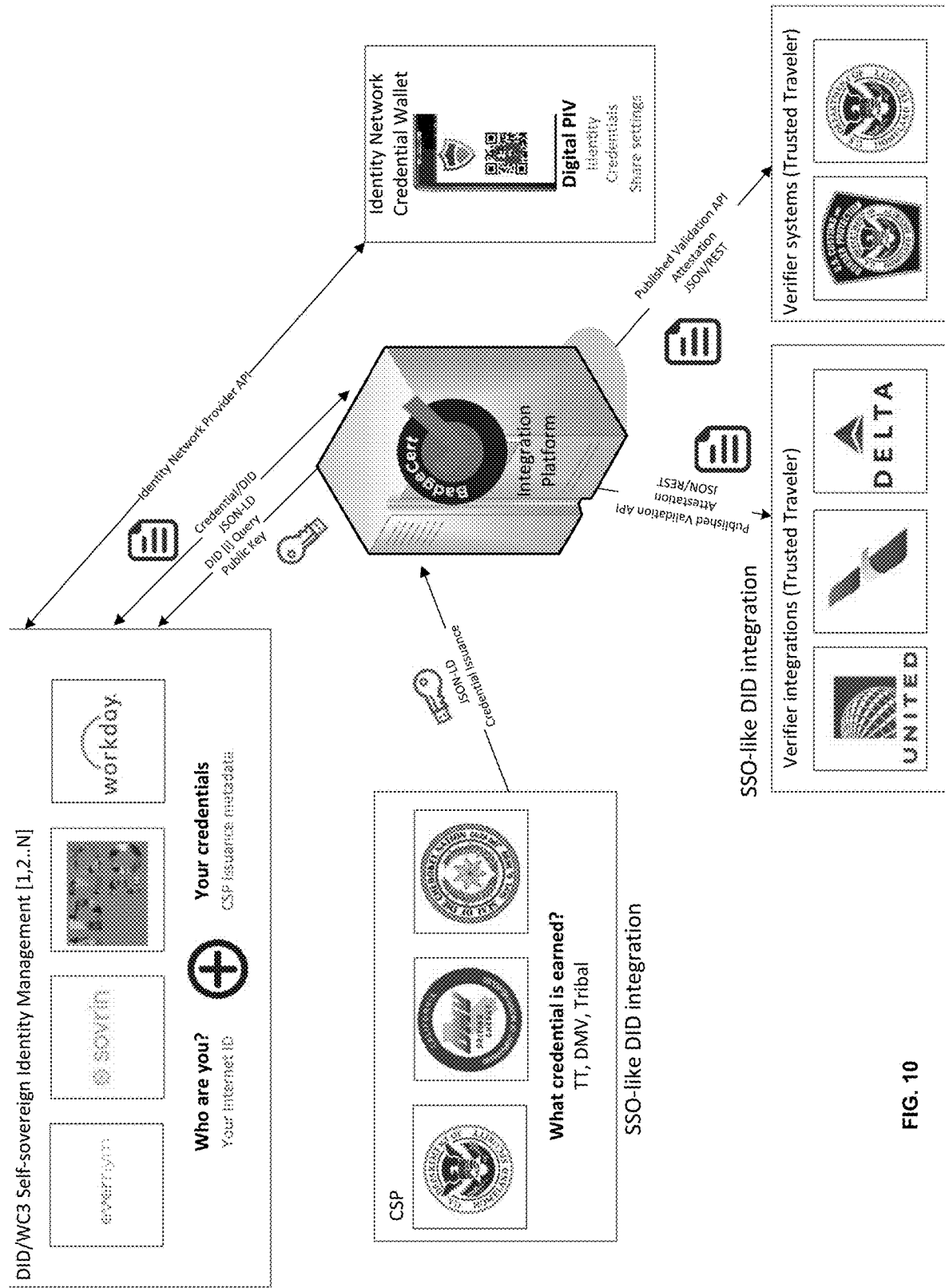
FIG. 10 is a block diagram of a system in accordance with certain embodiments of the disclosure, in accordance with an embodiment of the disclosure.

An alternative system architecture for the identity integration platform is provided in FIG. 10, in accordance with embodiments of the disclosure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following embodiments) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "includeing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention. No language in the specification should be construed as indicating any non-claimed element as essential to the practice of the invention.

Preferred embodiments are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of issuing a digital credential from a networked credential service provider to a user, the method comprising:
   receiving, via an application executing on a computing device local to the user, a selection of an identity network from plurality of identity networks, and a selection of the credential service provider;
   communicating with the selected identity network to validate the user's identity and receiving a public-key for the user;
   transmitting, to the credential service provider, the user's public-key with a request for issuance of the digital credential;
   receiving, from the credential service provider in response to the request, the issued digital credential for the user;
   transmitting, to the selected identity network, the issued digital credential for association with the user's identity;
   transmitting, to a distributed ledger, metadata representing the issued digital credential for recordation;
   receiving, from the credential service provider, a notification that the user's issued digital credential is no longer valid;
   transmitting, to the selected identity provider, a notification that the user's issued digital credential is no longer valid; and
   transmitting, to the distributed ledger, metadata representing that the issued digital credential has been revoked;
   wherein the issued credential is thereafter no longer viewable to the user through the application executing on the computing device.

2. The method of claim 1 further comprising:
   when no digital identification exists for the user on the selected identity network, facilitating creation of a digital identification for the user on the selected identity network.

3. The method of claim 1, wherein the metadata comprises JavaScript Object Notation for Linked Data (JSON-LD).

4. The method of claim 1, wherein the metadata contains anonymous data for the identity of the user.

5. The method of claim 1, wherein the credential service provider is a governmental agency.

6. The method of claim 5, wherein the credential service provider is a state agency for licensing of vehicle drivers and the credential is a vehicle operator's license.

7. A system for managing digital credentials, the system comprising:
   a plurality of credential service provider servers for issuing one or more digital certificates to a user, each certificate certifying the user has achieved an accomplishment;
   a plurality of decentralized identifier servers for managing the user's digital identity; and
   an identity integration platform server, in conjunction with a computing device comprising a hardware processor and in communication over a communications network with the plurality of credential service providers and the plurality of decentralized identifier servers, the identity integration platform server executing instructions to:
   receive a user selection of one of the plurality of decentralized identity servers;
   receive a user selection of one of the plurality of credential service provider servers;
   communicate with the selected decentralized identity server to validate the user's identity and receive a public-key for the user;
   transmit, to the credential service provider server, the user's public-key with a request for issuance of the digital credential;
   receive, from the credential service provider server in response to the request, the issued digital credential for the user;
   transmit, to the selected decentralized identity server, the issued digital credential for association with the user's identity;

receive, from the credential service provider server, a notification that the user's issued digital credential is no longer valid;

transmit, to the selected decentralized identity provider, a notification that the user's issued digital credential is no longer valid; and transmit, to the distributed ledger, metadata representing that the issued digital credential has been revoked.

8. The system of claim 7, further comprising:

a distributed ledger;

wherein the selected decentralized identity server causes metadata representing the issued digital credential for the user's identity to be recorded on the distributed ledger.

9. The system of claim 8, further comprising:

an application executing on a computing device local to the user and in communication with the identity integration platform;

wherein the user selection of the decentralized identity server and the credential service provider server is performed via the application through the identity integration platform server, and the issued credential is viewable to the user through the application prior to its revocation.

* * * * *